(12) United States Patent
Baek et al.

(10) Patent No.: US 7,958,537 B2
(45) Date of Patent: Jun. 7, 2011

(54) METHOD OF PROVIDING INITIAL PICTURES TO DIGITAL TV

(75) Inventors: Byung-seog Baek, Seongnam-si (KR); Yong-deok Kim, Anyang-si (KR); Seong-taek Park, Yongin-si (KR); Jae-beom Lee, Suwon-si (KR); Byung-hee Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1103 days.

(21) Appl. No.: 11/166,235

(22) Filed: Jun. 27, 2005

(65) Prior Publication Data

US 2005/0289614 A1    Dec. 29, 2005

(30) Foreign Application Priority Data

Jun. 25, 2004    (KR) .................. 10-2004-0048288

(51) Int. Cl.
| | |
|---|---|
| H04H 60/32 | (2008.01) |
| H04N 7/16 | (2006.01) |
| H04N 5/445 | (2006.01) |
| H04N 5/50 | (2006.01) |
| H04N 5/268 | (2006.01) |

(52) U.S. Cl. .......... 725/139; 725/15; 725/140; 348/563; 348/569; 348/705

(58) Field of Classification Search .............. 725/15, 725/139, 140; 348/705–706, 554, 558, 563, 348/569
See application file for complete search history.

(56) References Cited

U.S. PATENT DOCUMENTS

| | | | | |
|---|---|---|---|---|
| 4,651,342 | A * | 3/1987 | Mengel | 455/151.1 |
| 5,883,621 | A * | 3/1999 | Iwamura | 725/37 |
| 5,987,126 | A * | 11/1999 | Okuyama et al. | 380/203 |
| 6,292,943 | B1 * | 9/2001 | Shin et al. | 725/58 |
| 6,442,328 | B1 * | 8/2002 | Elliott et al. | 386/46 |
| 6,446,262 | B1 * | 9/2002 | Malaure et al. | 725/141 |
| 6,614,987 | B1 | 9/2003 | Ismail et al. | |
| 6,825,858 | B2 * | 11/2004 | Sato | 715/735 |
| 7,257,821 | B2 * | 8/2007 | Wendorf et al. | 719/328 |
| 2002/0024616 | A1 * | 2/2002 | Kim | 348/714 |
| 2002/0059588 | A1 * | 5/2002 | Huber et al. | 725/35 |
| 2002/0078453 | A1 * | 6/2002 | Kuo | 725/46 |
| 2002/0171763 | A1 * | 11/2002 | Stecyk et al. | 348/552 |
| 2004/0056883 | A1 * | 3/2004 | Wierowski | 345/719 |
| 2004/0133923 | A1 * | 7/2004 | Watson et al. | 725/134 |
| 2008/0229361 | A1 * | 9/2008 | Jerding et al. | 725/46 |

FOREIGN PATENT DOCUMENTS

| | | |
|---|---|---|
| CN | 1256567 A | 6/2000 |
| EP | 1 176 815 A2 | 1/2002 |
| JP | 2001-359050 A | 12/2001 |
| JP | 2003-347950 A | 12/2003 |
| WO | WO 03036948 A1 | 5/2003 |

* cited by examiner

*Primary Examiner* — Brian T Pendleton
*Assistant Examiner* — Jonathan Lewis
(74) *Attorney, Agent, or Firm* — Sughrue Mion, PLLC

(57) ABSTRACT

A method of providing initial pictures to a digital TV is provided. The method includes recognizing a set-top box, which is connected to the network and is activated, when a digital TV is turned on, issuing a request for transmitting broadcast signals for displaying initial pictures on the screen of the digital TV to the set-top box, and decoding the broadcast signals received from the set-top box and displaying the decoded broadcast signals.

7 Claims, 5 Drawing Sheets

METHOD OF PROVIDING INITIAL PICTURES TO DIGITAL TV

CROSS-REFERENCE TO RELATED APPLICATION

This application claims priority from Korean Patent Application No. 10-2004-0048288 filed on Jun. 25, 2004 in the Korean Intellectual Property Office, the disclosure of which is incorporated herein by reference in its entirety.

BACKGROUND OF THE INVENTION

1. Field of the Invention

Methods consistent with the present invention relate to providing initial pictures to digital television (TV), and more particularly, to providing initial pictures to the screen of a digital TV in a network that supports isochronous data communications.

2. Description of the Related Art

Digital broadcasting offers a better picture quality and clearer sound than conventional analog broadcasting. In digital broadcasting, audio and video data is transmitted over electronic waves and then is displayed on the screen of a digital TV in a digitalized manner. In other words, in digital broadcasting, all necessary operations, including modulation and demodulation of digital broadcast programs, are carried out in a digitalized manner. Thus, digital broadcasting is less affected by noise than analog broadcasting.

In addition, digital broadcasting can provide much more broadcast channels than analog broadcasting. In digital broadcasting, a plurality of programs can be transmitted using a single bandwidth, while in analog broadcasting, only one program can be transmitted using a single bandwidth of about 6 MHz. It is audio and video compression that has enabled such digital multi-channel broadcasting. In existing digital broadcasting techniques, broadcast programs are compressed using a Moving Picture Experts Group (MPEG)-2 transport stream (TS) format for transmission. In addition, digital broadcasting supports multi-channel sounds, for example, 5.1 channel sounds, and thus, when watching TV at home, a user can enjoy an acoustic effect equal to or approximate to the acoustic effect of a movie theater.

In order to receive a digital broadcast program, a digital broadcast receiver called a set-top box is needed. A digital broadcast receiver and a digital TV may be sold together or separately.

FIG. 1 is a diagram illustrating a digital broadcast receipt system 100.

Referring to FIG. 1, the digital broadcast receipt system 100 includes a TV 120, which is a regular TV, and a conventional set-top box 110. The conventional set-top box 110 receives a digital broadcast, reconstructs analog audio and video from the digital broadcast, and transmits the reconstructed analog audio and video to the TV 120. The digital broadcast transmitted to the conventional set-top box 110 may be classified into a digital terrestrial broadcast, a digital cable broadcast, or a digital satellite broadcast. A digital terrestrial broadcast can be received using an antenna (not shown), a digital satellite broadcast can be received using a satellite broadcast receiving antenna (not shown) having a parabolic surface, and a digital cable broadcast can be received using a coaxial cable 160. The conventional set-top box 110 receives digital broadcast programs in a desired bandwidth, which are multiplexed as MPEG-2 transport streams (TSs). Through tuning, the set-top box 110 demultiplexes the digital broadcast programs, and extracts video and audio data of a digital broadcast program selected by a user from the demultiplexed digital broadcast programs. Since the extracted video data is compressed in MPEG-2 format, the conventional set-top box 110 reconstructs video signals from the extracted video data by decoding the extracted video data with the use of an MPEG-2 decoder (not shown) installed therein. In addition, since the extracted audio data is compressed in AC-3 or DTS format, the conventional set-top box 110 reconstructs 5.1 channel audio signals from the extracted audio data by decoding the extracted audio data. The reconstructed video and audio signals are analog signals to be transmitted to the TV 120.

The conventional set-top box 10 and the TV 120 are connected to each other via an analog/video (A/V) cable 150. Therefore, the TV 120 can receive signals from the conventional set-top box 110 via the A/V cable 150. The TV 120 receives analog signals from the conventional set-top box 110, outputs the received analog signals as visible rays using a Braun tube, a plasma display panel (PDP), or a liquid crystal display (LCD). In addition, the TV 120 receives audio signals from the conventional set-top box 110 and outputs the received audio signals using a speaker.

FIG. 2 is a diagram illustrating a digital broadcast receipt system 200. Referring to FIG. 2, the digital broadcast receipt system 200, unlike the digital broadcast receipt system 100 of FIG. 1, includes a digital TV 220. Accordingly, a conventional set-top box 210 included in the digital broadcast receipt system 200, unlike the set-top box 110 of FIG. 1, does not need to reconstruct video and audio signals from the compressed video and audio data by decoding the compressed video and audio data. The set-top box 210 receives digital broadcast programs, which are multiplexed as MPEG-2 TSs, in one of a plurality of bandwidths using a tuner (not shown), demultiplexes the digital broadcast programs, and extracts video and audio data of a digital broadcast program selected by a user from the demultiplexed digital broadcast programs.

When extracting video data, audio data, and other data of the selected digital broadcast program, the set-top box 210 uses physical identifiers (PIDs), which are numbers allotted to video data, audio data, and other data transmitted from each broadcasting station. For example, supposing that PIDs 3, 7, and 8 are allotted to video data, audio data, and other data (such as subtitles), respectively, of a broadcast program on channel 24, the conventional set-top box 210 extracts the broadcast program on channel 24 by extracting only data designated by the PIDs 3, 7, and 8 from input digital broadcast signals. The extracted broadcast program comprised of video data, audio data, and other data is transmitted to the digital TV 220 as digitalized data via a network cable 250.

Various digital devices can be connected to the digital TV 220 and the conventional set-top box 210, which are connected to each other via the network cable 250. For example, as shown in FIG. 2, a digital camcorder 230 and an audio player 240 may be connected to the digital TV 220, in which case, the digital TV 220 can display pictures received from the digital camcorder 230 on its screen or can output audio signals transmitted thereto using the audio player 240.

Initialization of a digital TV to which various digital devices are connected in a network will now be described in detail with reference to FIG. 3. Referring to FIG. 3, in operation S310, if the digital TV is in a power-off mode or standby mode, a user issues a command to turn on or activate the digital TV using a user interface, such as a control button attached on the digital TV or a remote controller, so that the digital TV is turned on or activated.

In operation S312, the digital TV recognizes devices connected to it in a network through a discovery operation, such as a set-top box. In operation S314, the digital TV sets up the set-top box. The setup of the set-top box involves identifying a current state of the set-top box and setting parameters in the set-top box necessary for operation of the set-top box. For example, if the set-top box is turned off or stands by, parameters necessary for turning on or activating the set-top box are sent to the set-top box. If the set-top box has already been activated, the sending of the parameters necessary for activating the set-top box may be skipped.

After initial operations, i.e., operations S310, S312, and S314, the user issues a command to select a main menu using the user interface in operation S320. Then, the digital TV displays the main menu on its screen.

In operation S322, the user selects the set-top box using the main menu in order to watch a digital broadcast program via the set-top box. If the set-top box is selected, the digital TV displays menus for controlling the set-top box on its screen.

In operation S324, the user selects a channel using a channel selection menu, which is one of the menus for controlling the set-top box. The user may select a desired channel by directly inputting a channel number corresponding to the channel into the digital TV or by checking up a plurality of channels provided by an electronic program guide (EPG) and then selecting one of the channels.

The EPG is provided to the digital TV through broadcasting via the set-top box. If the user selects the channel of interest in operation S324, the digital TV sends channel information of the selected channel to the set-top box and issues a request for sending a broadcast program of the selected channel to the set-top box.

In operation S330, the set-top box sends the requested broadcast program to the digital TV as MPEG-2 TSs, and the digital TV receives the MPEG-2 TSs sent by the set-top box. In operation S332, the digital TV obtains video and audio signals and other data by decoding the received MPEG-2 TSs.

Conventionally, the user is required to perform at least three operations for manipulating a digital TV, i.e., operations S320, S322, and S324, to watch a broadcast program, which is very inconvenient. In order to solve this problem, an IEEE 1394-based digital AV networking initiative dubbed HAVi (Home Audio Video interoperability) (www.havi.org) has been suggested. HAVi alleviates a user's inconvenience by enabling the digital TV to memorize a device that it most recently accessed before being turned off, such that it automatically accesses the device ahead of other devices as soon as it is turned on. However, this type of method may cause problems especially when devices are disconnected from an IEEE 1394-based network. For example, referring to FIG. 2, if the digital TV 220 is turned off while displaying pictures received from the digital camcorder 230 and then a user disconnects the digital camcorder 230 from a network, no picture is displayed on the screen of the digital TV 220 when the digital TV 220 is turned on. In other words, when the digital TV 220 is turned on, it attempts to search for the digital camcorder 230 through a discovery operation because the digital camcorder 230 is the device that it had most recently accessed. However, the digital camcorder 230 does not exist any longer in the network. Therefore, the digital TV 220 cannot receive any video signals from the digital camcorder 230. Therefore, the digital TV 220 does not display any initial pictures on its screen.

SUMMARY OF THE INVENTION

The present invention provides a method of providing initial pictures to a digital TV connected to a network when the digital TV is turned on. The present invention also provides a method of providing initial pictures determined at the request of a user to a digital TV.

According to an aspect of the present invention, there is provided a method of providing initial pictures to a digital TV including recognizing a set-top box, which is connected to the network and is activated, when a digital TV is turned on, issuing a request for transmitting broadcast signals for displaying initial pictures on the screen of the digital TV to the set-top box, and decoding the broadcast signals received from the set-top box and displaying the decoded broadcast signals.

According to another aspect of the present invention, there is provided a method of providing initial pictures to a digital TV connected to a network that supports isochronous data communications, the method including setting an initial screen mode in a digital TV at the request of a user, and enabling a digital TV to display initial pictures on its screen according to the set initial screen mode when the digital TV is turned on.

BRIEF DESCRIPTION OF THE DRAWINGS

The above and other aspects of the present invention will become more apparent by describing in detail exemplary embodiments thereof with reference to the attached drawings, in which.

DETAILED DESCRIPTION OF THE INVENTION

Figure 1:
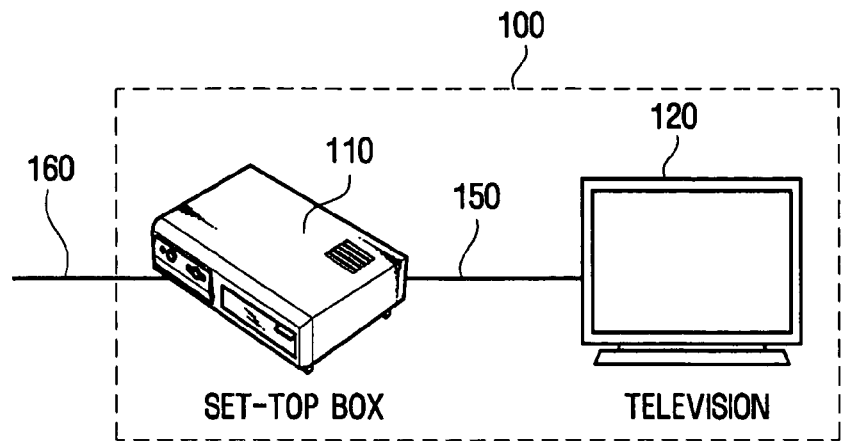
FIG. 1 is a diagram illustrating a digital broadcast receipt system.
Figure 2:
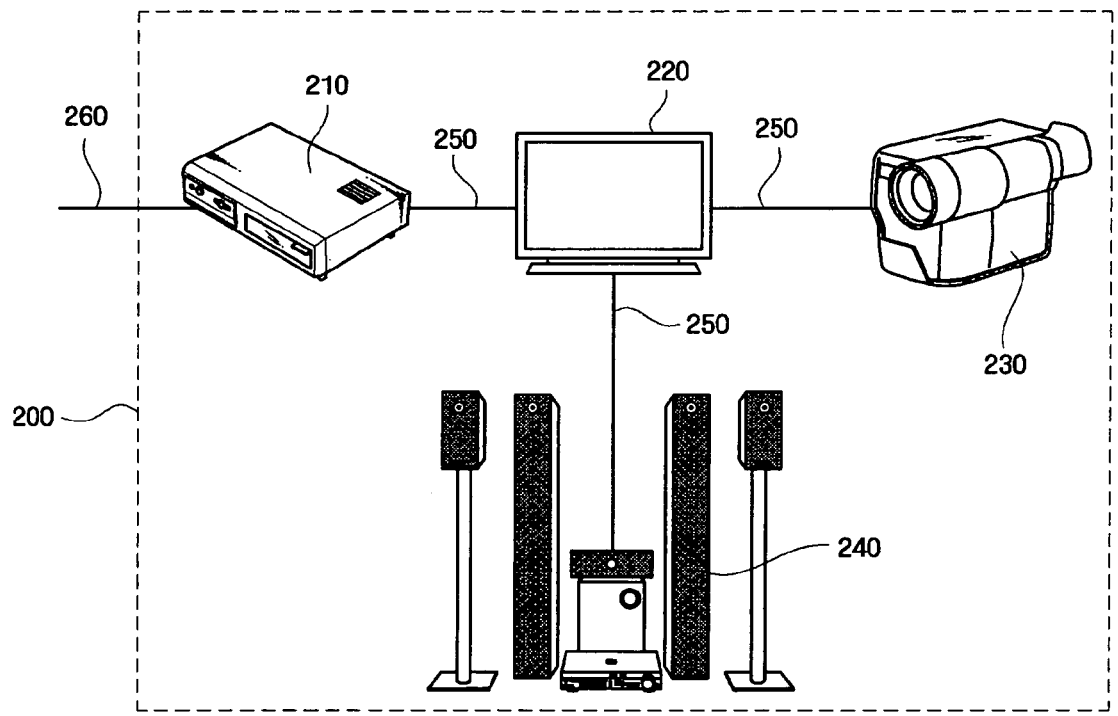
FIG. 2 is a diagram illustrating another digital broadcast receipt system.
Figure 3:
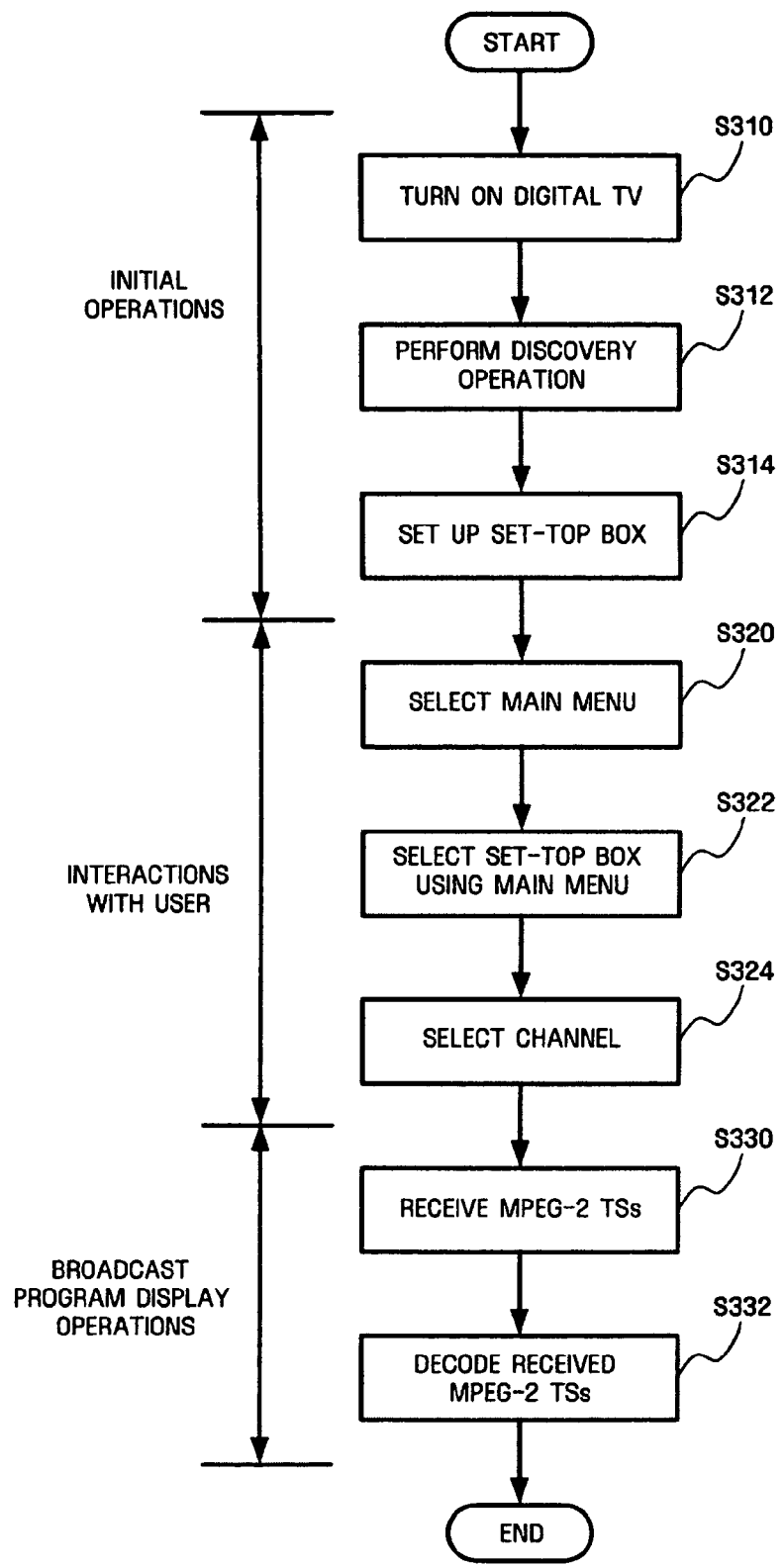
FIG. 3 is a flowchart of a conventional method of initializing a digital TV connected to a network.

The present invention will now be described more fully with reference to the accompanying drawings, in which exemplary embodiments of the invention are shown. In the embodiments of the present invention, initial pictures are provided to a digital TV in a network where the digital TV and at least one device are connected to each other. The digital TV needs video and audio data, which are generally transmitted to the digital TV in real time and require a network environment with a high Quality of Service (QoS) ensured. Such network environment can be realized using various techniques, and in particular, using IEEE 1394-based techniques.

IEEE 1394 interfaces can achieve high transmission speed. Specifically, IEEE 1394 interfaces can achieve a speed of 100 Mbps, 200 Mbps, or 400 Mbps depending on the type of mode in which they operate. Currently, research on ways to provide a speed of 800 Mbps or 1.6 Gbps is now underway. Since IEEE 1394 interfaces can achieve such high transmission speed, they are suitable for transmitting video and audio data and connecting multimedia devices, such as a digital camera and a digital camcorder. In addition, according to IEEE 1394, a high transmission speed mode is compatible with a low transmission speed mode. For example, a 200 Mbps mode is compatible with a 100 Mbps mode, and a 400 Mbps mode is compatible with both the 100 Mbps mode and the 200 Mbps mode. Moreover, IEEE 1394 interfaces can provide superior bi-directional communications and various plug-and-play functions (hot-plugging functions, in particular). IEEE 1394 protocols are designed to be able to readily respond to any change in a network where modules are connected to one another via cables. Modules can be freely disconnected from an IEEE 1394-based network even when they are in use, or new modules can be freely attached to the IEEE 1394-based network without inversely affecting other modules in the IEEE 1394-based network. If a module is disconnected from or attached to a network during the operation of a daisy chain, the shape of the daisy chain changes. Thus, any information available is reset, and new addresses are allotted to modules in the daisy chain. Thereafter, the modules inform one another of their new addresses and prepare themselves to resume their operations.

One of the most advantageous features of the IEEE 1394 interface in terms of establishing a network of multimedia devices including a digital TV is an isochronous data transmission function. The term "isochronous" is associated with transmission of a cycle signal in which a time interval separating two related transitions is equal to a unit interval or to a multiple of the unit interval. In other words, two significant instants of two or more sequential signals have a constant phase relationship. Isochronous data transmission ensures the amount of data transferred from individual modules connected to a network to be transmitted continuously during a predetermined time period. Due to such isochronous characteristics, an IEEE 1394-based network enables modules connected thereto to continuously transmit data in real time. Video and audio data generally need to be transmitted in real time. An IEEE 1394-based network including a digital TV will now be described in detail.

Terms Used in IEEE 1394

Node

A node is an addressable device attached to a serial bus and has a minimum set of control registers. Changing control registers of a node does not affect control registers of another node. A node has a node identifier, which is a 16-bit number, and a node controller, which exclusively provides the node and applications, transactions, links, and physical elements located at the node with coordination points for a management function.

Node Identifier

A node identifier differentiates nodes in a system from one another. A node identifier includes a bus identifier, which is comprised of the 10 most significant bits of the node identifier and is given to a plurality of nodes connected to the same bus, and a physical identifier (PID), which is comprised of 6 least significant bits of the node identifier and is a unique value given to only one node.

Arbitration

Arbitration is a process in which nodes contend with each other for the right to occupy a bus. A hierarchical point-to-point algorithm is used in a cable environment. Only one node that wins the contention for the right to occupy a bus can transmit data packets using the bus.

Self-Identifying Packet

A self-identifying packet is a special packet sent to a cable physical layer in a self-identifying phase followed by a reset phase. A node may send 1 to 4 self-identifying packets to the cable physical layer. The number of self-identifying packets that a node can send to the cable physical layer is dependent on the number of ports of the node.

Module

A module is a physical package (a printed circuit board or a set of multiple boards) comprised of one or more nodes. A module can be easily removed from a network or can be easily replaced with another module. A module is considered as a physical package, while a node is considered as a logical address. In a typical operation, modules are not seen by software. However, in a case where one module is replaced with another module, a failure in a shared bus interface occurs, or specialized module analysis software is utilized. Modules can be seen by software.

In the following embodiments of the present invention, modules, including a digital TV and a set-top box, are assumed to operate in an IEEE 1394-based network. The digital TV and the set-top box may include at least one node.

Figure 4:
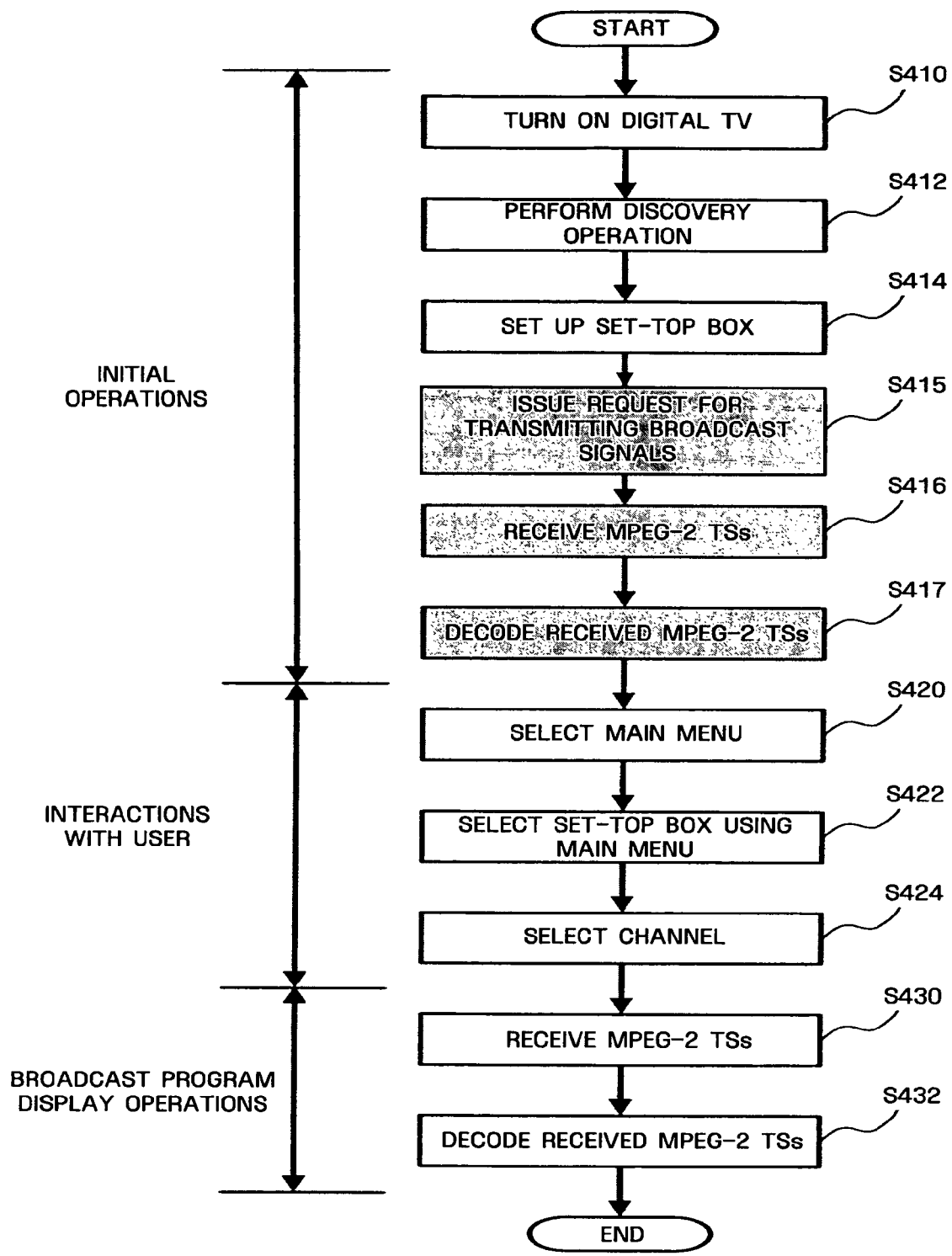
FIG. 4 is a flowchart of a method of initializing a digital TV connected to a network, according to an exemplary embodiment of the present invention.

FIG. 4 is a flowchart of a method of initializing a digital TV connected to a network, according to an exemplary embodiment of the present invention.

Referring to FIG. 4, in operation S410, if a digital TV is turned off or in a standby mode, a user issues a command to turn on the digital TV using a user interface, such as a remote controller or a control button attached on the digital TV, so the digital TV is turned on. The topology of an IEEE 1394-based network to which the digital TV is connected changes when the digital TV is turned on, and thus, a bus initialization operation is performed. In other words, if the digital TV joins a bus, it transmits a bus reset signal to make all nodes connected to the bus remove topology information. After resetting the bus, typical network topology is translated as a tree through a tree identification process. Accordingly, one of a plurality of nodes is designated as the root of the tree, and all physical connections among the nodes originate from the node designated as the root of the tree. Nodes that are excluded from the tree cannot participate in an arbitration process. The digital TV may be a root node.

In operation S412, the digital TV recognizes devices connected to the IEEE 1394-based network by performing a discovery operation. The discovery operation may be performed based on a self-identification operation in the IEEE 1394-based network. In the self-identification operation, a plurality of nodes connected to the bus are given an opportunity to choose PIDs of their own and introduce themselves to a management element connected to the bus by transmitting one to four short packets, including the chosen PIDs and management information, to the management element at a base rate via a cable. The management information may contain the characteristics of each of the nodes connected to the bus. For example, management information of the set-top box may specify that set-top box-related functions are to be provided, and management information of a digital camcorder may specify that video data is to be provided. Management information of each of a plurality of devices connected to the IEEE 1394-based network is stored in a configuration ROM of a corresponding device, and the devices can recognize each other's functions by reading the respective management information. A PID is a number of self identification packets a node receives before it is given the opportunity to send its own self identification packet. For example, a first node that transmits a self-identifying packet for the first time chooses the number 0 as its PID, and a second node that transmits a self-identifying packet following the first node chooses the number 1 as its PID. As a result of the self-identification operation, the digital TV and the set-top box have node identifiers of their own. As a result of the discovery operation performed in operation S412, the digital TV recognizes the existence of the set-top box in its IEEE 1394-based network.

In operation S414, the digital TV sets up the set-top box. The setup of the set-top box involves identifying a current state of the set-top box and setting parameters necessary for operating the set-top box in the set-top box. For example, if the set-top box is turned off or is in a standby mode, the digital TV sends parameters necessary for turning on or activating the set-top box to the set-top box so that the set-top box is turned on or activated. If the set-top box is activated, the sending of the parameters necessary for activating the set-top box may be skipped.

In operation S415, the digital TV issues a request for transmitting signals to the set-top box. At the request of the digital TV, the set-top box may provide the digital TV with a digital broadcast program of a channel most recently accessed by the digital TV. Alternatively, the set-top box may provide the digital TV with a digital broadcast program of a channel designated as a default channel. The set-top box performs an arbitration operation in order to provide a digital broadcast program to the digital TV. As a result of the arbitration operation, a period of time during which the set-top box is allowed to transmit a digital broadcast program to the digital TV and a bandwidth that the set-top box is allowed to use to transmit the digital broadcast program to the digital TV are determined.

In operation S416, the digital TV receives a digital broadcast program from the set-top box as MPEG-2 TSs. The digital TV reconstructs video and audio data from the MPEG-2 TSs received from the set-top box by decoding the received MPEG-2 TSs in S417 and then outputs the reconstructed video and audio data. In the present embodiment, initial pictures are provided to the digital TV even if the user has not yet selected a channel of interest during initial operations, i.e., operations S410 through S417. In addition, in the present embodiment, unlike in a HAVi system, such initial pictures are provided to the digital TV regardless of a device most recently accessed by the digital TV.

In operation S420, the user issues a command to select a main menu using the user interface. Accordingly, the digital TV displays a main menu on its screen. In operation S422, the user selects the set-top box using the main menu in order to watch a digital broadcast program via the set-top box. When the set-top box is selected using the main menu, the digital TV displays menus for controlling the set-top box on its screen.

In operation S424, the user selects a channel so as to watch a digital broadcast program of the selected channel. The user may select a desired channel by directly inputting a channel number corresponding to the channel into the digital TV or by checking up a plurality of channels provided by an EPG and choosing one of the plurality of channels.

The EPG is provided to the digital TV through broadcasting via the set-top box. If the user selects the channel of interest in operation S424, the digital TV sends channel information of the selected channel to the set-top box and issues a request for sending a broadcast program of the selected channel to the set-top box.

In operation S430, the set-top box sends the requested broadcast program to the digital TV as MPEG-2 TSs, and the digital TV receives the MPEG-2 TSs sent by the set-top box. In operation S432, the digital TV obtains video and audio signals and other data by decoding the received MPEG-2 TSs.

In the present exemplary embodiment, initial pictures displayed on the screen of the digital TV are of a channel most recently accessed by the digital TV or of a channel set in the set-top box as a default channel. A method of determining the initial pictures with reference to channel information stored in the digital TV will now be described in detail with reference to FIG. 5.

Figure 5:
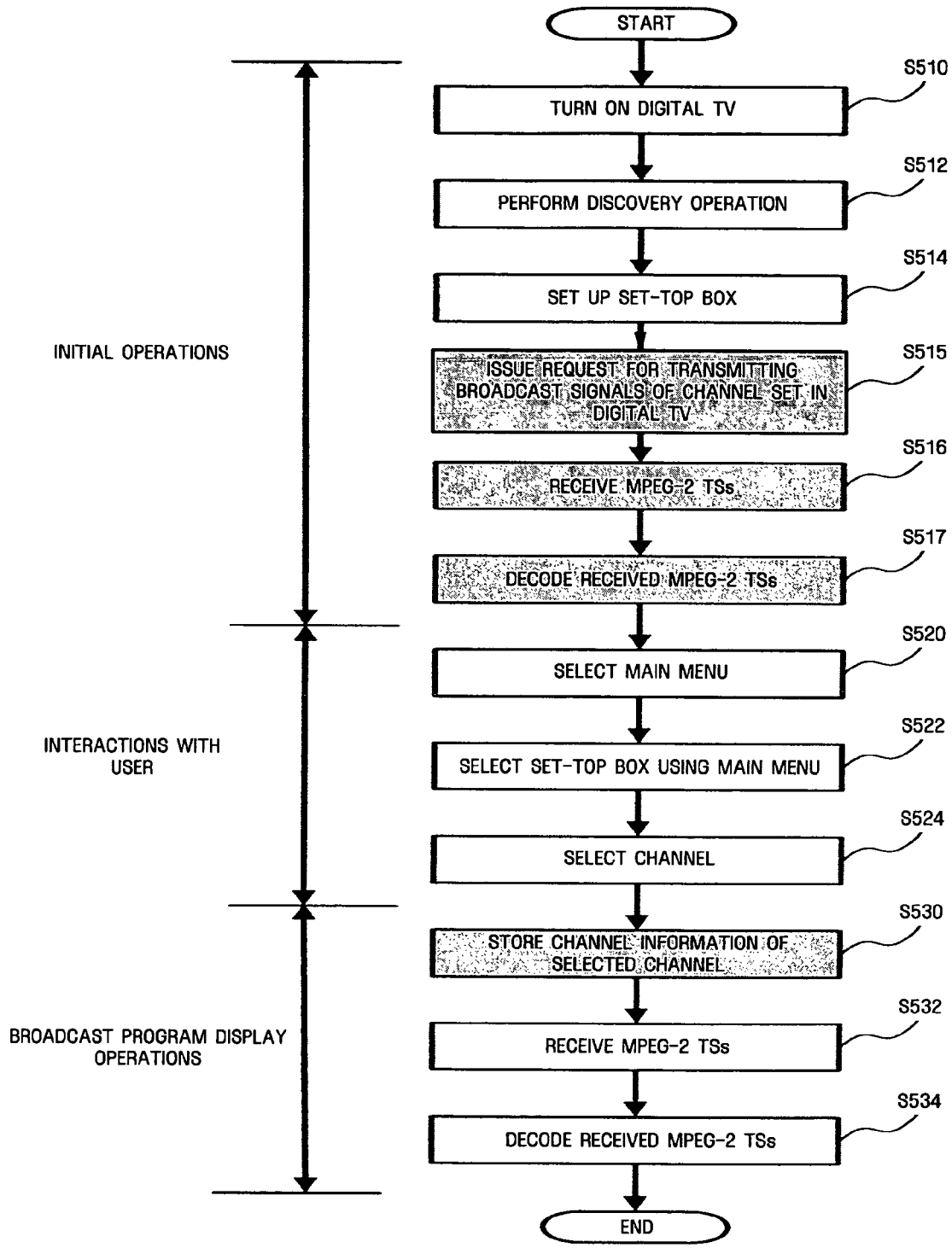
FIG. 5 is a flowchart of a method of initializing a digital TV connected to a network, according to another exemplary embodiment of the present invention.

FIG. 5 is a flowchart of a method of initializing a digital TV connected to a network, according to another exemplary embodiment of the present invention. Referring to FIG. 5, in operation S510, if a digital TV is turned off or in a standby mode, a user issues a command to turn on the digital TV using a user interface, such as a remote controller or a control button attached on the digital TV, so the digital TV is turned on.

In operation S512, the digital TV recognizes devices connected to the network by performing a discovery operation. As a result of the discovery operation, the digital TV recognizes the existence of a set-top box in its network.

In operation S514, the digital TV sets up the set-top box. The setup of the set-top box involves identifying a current state of the set-top box and setting parameters necessary for operating the set-top box in the set-top box. For example, if the set-top box is turned off or is in a standby mode, the digital TV sends parameters necessary for turning on or activating the set-top box to the set-top box so that the set-top box is turned on or activated. If the set-top box is activated, the sending of the parameters necessary for activating the set-top box may be skipped.

In operation S515, the digital TV issues a request for transmitting a digital broadcast program of a channel most recently accessed by it to the set-top box. Then, the set-top box sends a digital broadcast program of the requested channel to the digital TV.

In operation S516, the digital TV receives the digital broadcast program of the requested channel from the set-top box as MPEG-2 TSs. The digital TV reconstructs video and audio data from the received MPEG-2 TSs by decoding the received MPEG-2 TSs and outputs the reconstructed video and audio data. In the present embodiment, initial pictures can be provided to the digital TV even if the user has not yet selected a channel of interest during the initial operations. In addition, in the present embodiment, unlike in a HAVi system, such initial pictures are provided to the digital TV regardless of a device most recently accessed by the digital TV.

In operation S520, the user issues a command to select a main menu using the user interface. Accordingly, the digital TV displays a main menu on its screen. In operation S522, the user selects an item "set-top box" from the main menu in order to watch a digital broadcast program. When the item "set-top box" is selected from the main menu, the digital TV displays menus for controlling the set-top box on its screen.

In operation S524, the user selects a channel of interest in order to watch a digital broadcast program. The user may select the channel of interest by directly inputting a channel number corresponding to the channel of interest into the digital TV or by checking up a plurality of channels provided by an EPG and choosing one of the plurality of channels. The EPG is provided to the digital TV through broadcasting via the set-top box. If the user selects the channel of interest in operation S524, the digital TV sends channel information of the selected channel to the set-top box and issues a request for sending a broadcast program of the selected channel to the set-top box.

In operation S530, the digital TV stores channel information of the selected channel. The channel information of the selected channel is stored in a non-volatile memory of the digital TV so that it is not erased even when the digital TV is turned off. The channel information of the selected channel may be stored in a flash memory which is readable, writable, and erasable. In operation S530, the set-top box also sends the requested broadcast program to the digital TV as MPEG-2 TSs, and the digital TV receives the MPEG-2 TSs from the set-top box.

In operation S532, the digital TV obtains video data, audio data, and other data by decoding the received MPEG-2 TSs.

In the exemplary embodiments of the present invention, initial pictures are provided to a digital TV without a user's manipulation or regardless of a device most recently accessed by the digital TV when the digital TV is turned on. Such an initial screen mode can be changed at the request of the user, which will now be described in detail with reference to FIG. 6.

Figure 6:
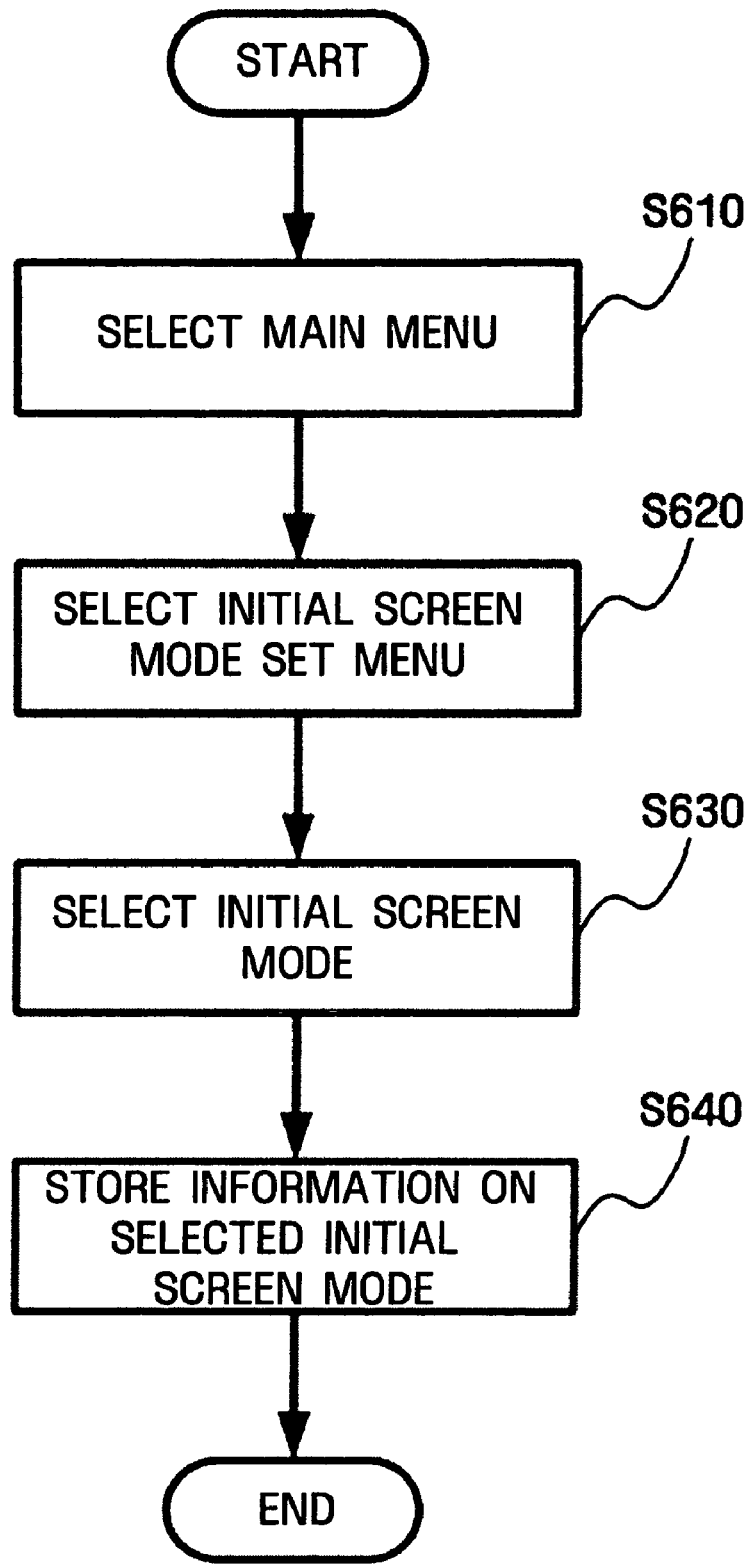
FIG. 6 is a flowchart of a method of setting an initial screen mode in a digital TV connected to a network, according to an exemplary embodiment of the present invention.

FIG. 6 is a flowchart of a method of setting an initial screen mode in a digital TV connected to a network, according to an exemplary embodiment of the present invention. Referring to FIG. 6, in operation S610, a user selects a main menu of a digital TV using a user interface, such as a remote controller or a control button attached on the digital TV. The main menu provides various functions for the user. For example, by using the main menu, the user can select one of a plurality of devices recognized by the digital TV and then access the selected device, can adjust the brightness and hue of a screen of the digital TV, and can obtain information on broadcast programs to be aired on each channel with reference to an EPG.

In operation S620, the user selects a menu for selecting one of a variety of initial screen modes using the main menu. Initial pictures are pictures displayed on the screen of the digital TV without the user's manipulation (such as channel selection) when the digital TV is turned on. Therefore, in the selected initial screen mode, a broadcast program may be displayed on the screen of the digital TV when the digital TV is turned on, as described above with reference to FIG. 4 or 5. Alternatively, in the selected initial screen mode, a broadcast program may be displayed on the screen of the digital TV only when the digital TV fails to search for and access a device most recently accessed by it within a predetermined amount of time, for example, within 2 seconds, as described above with reference to FIG. 4 or 5.

In operation S630, the digital TV is set to the selected initial screen mode. Then, in operation S640, information on the selected initial screen mode is stored in a non-volatile memory, for example, a flash memory or an EEPROM.

Those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

According to the present invention, it is possible to provide initial pictures to the digital TV as soon as the digital TV is turned on without interactions with a user. In addition, the present invention allows the user to select one of a plurality of initial screen modes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of providing pictures to a digital television (TV) connected to a network supporting isochronous data communications, the method comprising:
   setting an initial screen mode in a digital TV at a request of a user; and
   displaying, in response to the digital TV being turned on, an initial picture on a screen according to the initial screen mode which is set,
   wherein the displaying comprises:
      the digital TV performing a discovery operation for discovering devices connected to the digital TV within a predetermined amount of time, the digital TV searching for and attempting to access a most recently accessed device among the devices during the discovery operation,
      displaying, in response to successfully accessing the most recently accessed device, an initial picture provided by the most recently accessed device, and
      displaying, in response to the digital TV not finding the most recently accessed device during the discovery operation or in response to an unsuccessful attempt to access the most recently accessed device, an initial picture provided by a set-top box connected to the digital TV.

2. The method of claim 1, wherein the network is an IEEE 1394-based network.

3. The method of claim 1, wherein if the set-top box is not activated, the digital TV activates the set-top box and then issues a request to the set-top box to transmit broadcast signals comprising the initial picture.

4. A recording medium having a computer readable program recorded therein, the program for executing a method of providing pictures to a digital television (TV) connected to a network supporting isochronous data communications, the method comprising:
   setting an initial screen mode in a digital TV at a request of a user; and
   displaying, in response to the digital TV being turned on, an initial picture on a screen according to the initial screen mode which is set,
   wherein the displaying comprises:
      the digital TV performing a discovery operation for discovering devices connected to the digital TV within a predetermined amount of time, the digital TV searching for and attempting to access a most recently accessed device among the devices during the discovery operation,
      displaying, in response to successfully accessing the most recently accessed device, an initial picture provided by the most recently accessed device, and
      displaying, in response to the digital TV not finding the most recently accessed device during the discovery operation or in response to an unsuccessful attempt to access the most recently accessed device, an initial picture provided by a set-top box connected to the digital TV.

5. The method of claim 1, wherein the initial picture is based on a channel that was last selected when the digital TV was previously on.

6. The method claim of claim 1, further comprising storing the initial screen mode which is set in a memory of the digital TV.

7. The recording medium of claim 4, the method further comprising storing the set initial screen mode which is set in a memory of the digital TV.

* * * * *